(12) United States Patent
Ohtomo (10) Patent No.: US 8,860,368 B2
(45) Date of Patent: Oct. 14, 2014

(54) ELECTRIC CHARGING SYSTEM AND ELECTRIC VEHICLE

(71) Applicant: Fuji Jukogyo Kabushiki Kaisha, Tokyo (JP)

(72) Inventor: Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 165 days.

(21) Appl. No.: 13/670,344

(22) Filed: Nov. 6, 2012

(65) Prior Publication Data
US 2013/0127414 A1 May 23, 2013

(30) Foreign Application Priority Data

Nov. 18, 2011 (JP) ................. 2011-252774

(51) Int. Cl.
*H02J 7/00* (2006.01)
*H02J 7/14* (2006.01)
*B60L 11/18* (2006.01)
*B60L 3/00* (2006.01)

(52) U.S. Cl.
CPC .............. *B60L 11/1809* (2013.01); *Y02T 90/14* (2013.01); *Y02T 10/7005* (2013.01); *B60L 11/1838* (2013.01); *B60L 3/0069* (2013.01); *Y02T 10/7088* (2013.01); *Y02T 90/163* (2013.01); *Y02T 90/128* (2013.01)
USPC ........................... 320/109; 320/104; 320/132

(58) Field of Classification Search
CPC ...................................................... Y02T 90/14
USPC ......................................................... 320/109
See application file for complete search history.

(56) References Cited

FOREIGN PATENT DOCUMENTS

JP 2009-083670 A 4/2009

*Primary Examiner* — Edward Tso
*Assistant Examiner* — Ahmed Omar
(74) *Attorney, Agent, or Firm* — McGinn IP Law Group, PLLC (57) ABSTRACT

In an electric charging system (and electric vehicle), Electric-charger-side data Ds are calculated by subjecting an electric-charger-side supplied voltage Vs to filter processing, and electric-vehicle-side data Dr are calculated by subjecting an electric-vehicle-side received voltage Vr to filter processing. A reference point $\alpha 1$ is set for the electric-charger-side data Ds on the basis of the variation in the rise rate of the electric-charger-side data Ds. Likewise, a reference point $\alpha 2$ is set for the electric-vehicle-side data Dr based on variation in the rise rate of the electric-vehicle-side data Dr. When an insulation failure between the electric charger and the electric vehicle is determined, a time lag T between the electric-charger-side data Ds and the electric-vehicle-side data Dr is calculated based on the reference points $\alpha 1$ and $\alpha 2$, and the electric-charger-side data Ds and the electric-vehicle-side data Dr that are synchronized based on the time lag T are compared.

8 Claims, 8 Drawing Sheets

*Fig. 6* ness of the comparison
ELECTRIC CHARGING SYSTEM AND ELECTRIC VEHICLE

CROSS REFERENCES TO RELATED APPLICATIONS

The present application claims priority from Japanese Patent Application No. 2011-252774 filed on Nov. 18, 2011, the entire contents of which are hereby incorporated by reference.

BACKGROUND OF THE INVENTION

1. Field of the Invention

The present invention relates to an electric charging system and an electric vehicle, and, in particular, to a technology for determining a power supply state between a charger and an electric vehicle.

2. Description of the Related Art

In recent years, electric vehicles that are equipped with an electric motor for propulsion have been under development. When an electric storage device such as a battery that is installed at the electric vehicle is charged, a charging cable extending from an electric charger is connected to a charging port of the electric vehicle (see, for example, Japanese Unexamined Patent Application Publication No. 2009-83670). Furthermore, in the field of hybrid electric vehicles that are equipped with an engine and an electric motor for propulsion, a hybrid electric vehicle of the so-called plug-in system, in which an electric storage device is charged with an electric charger, is under development.

However, since power supplied from the electric charger to the electric vehicle has a high voltage and a high capacity, it is necessary to monitor the insulation failure and disconnection of the charging cable in order to prevent current leak and ensure safety during charging. A method of comparing the voltage supplied from the electric charger with the voltage received by the electric vehicle and a method of comparing the current supplied from the electric charger with the current received by the electric vehicle are known as methods for monitoring insulation failure and the like. When there is a large difference between the supplied and received voltages or between the supplied and received current, it can be assumed that the power flow is occurring to other than the electric vehicle and it can be determined that an insulation failure or the like has occurred.

When the insulation failure or the like is thus detected, voltage data or current data outputted from the voltage sensor or current sensor are used, but when those data are used the effect of noise is typically eliminated by performing a filter processing such as a moving average processing. However, since a time lag appears in voltage data or current data after the filter processing, simple comparison of voltage data at the electric charger side and the electric vehicle side causes erroneous determination of insulation failure and the like. Thus, when a difference in lag time occurs between the electric charger side and the electric vehicle side and the data from the electric charger side and the electric vehicle side are not synchronized, there is a large separation between the two groups of data even when no insulation failure has occurred, and there is no separation between the two groups of data even when an insulation failure has occurred.

SUMMARY OF THE INVENTION

It is an object of the present invention to determine accurately whether or not the power supply state between the electric charger and the electric vehicle is normal.

An aspect of the present invention provides an electric charging system in which an electric charger and an electric vehicle are connected by a charging cable, and an electric storage device installed in the electric vehicle is charged, this system including: a first reference setting unit for setting a reference point on the basis of a variation rate of supply-side processing data, the reference point being set with respect to the supply-side processing data that are calculated by subjecting a supplied voltage, a supplied current, or a supplied power at the electric charger side to a predetermined filter processing; a second reference setting unit for setting a reference point on the basis of a variation rate of reception-side processing data, the reference point being set with respect to the reception-side processing data that are calculated by subjecting a received voltage, a received current, or a received power at the electric vehicle side to a predetermined filter processing; a data synchronization unit for synchronizing the supply-side processing data and the reception-side processing data on the basis of the reference points of the supply-side processing data and the reception-side processing data; and a determination unit for comparing the synchronized supply-side processing data and the reception-side processing data and determining whether or not the power supply state between the electric charger and the electric vehicle is normal.

Preferably, the electric charger performs constant-current charging in which the supplied current is raised to a predetermined current and then held at the predetermined current; the first reference setting unit detects a difference in a variation rate of the supply-side processing data between a rising process and a holding process for the supplied current and sets the reference point for the supply-side processing data at a portion thereof where switching from the rising process to the holding process occurs; and the second reference setting unit detects a difference in a variation rate of the reception-side processing data between a rising process and a holding process of the supplied current and sets the reference point for the reception-side processing data at a portion thereof where switching from the rising process to the holding process occurs.

Preferably, the data synchronization unit calculates a time lag between the supply-side processing data and the reception-side processing data on the basis of the reference points and synchronizes the supply-side processing data and the reception-side processing data on the basis of the time lag.

Another aspect of the present invention provides an electric vehicle provided with an electric storage device connected to an electric charger by a charging cable and charged by the electric charger, this vehicle including: a first reference setting unit for setting a reference point on the basis of a variation rate of supply-side processing data, the reference point being set with respect to the supply-side processing data that are calculated by subjecting a supplied voltage, a supplied current, or a supplied power at the electric charger side to a predetermined filter processing; a second reference setting unit for setting a reference point on the basis of a variation rate of reception-side processing data, the reference point being set with respect to the reception-side processing data that are calculated by subjecting a received voltage, a received current, or a received power at the electric vehicle side to a predetermined filter processing; a data synchronization unit for synchronizing the supply-side processing data and the reception-side processing data on the basis of the reference points of the supply-side processing data and the reception-side processing data; and a determination unit for comparing the synchronized supply-side processing data and reception-side processing data and determining whether or not the power supply state between the electric charger and the electric vehicle is normal.

Preferably, the electric charger performs constant-current charging in which the supplied current is raised to a predetermined current and then held at the predetermined current; the first reference setting unit detects a difference in a variation rate of the supply-side processing data between a rising process and a holding process of the supplied current and sets the reference point for the supply-side processing data at a portion thereof where switching from the rising process to the holding process occurs; and the second reference setting unit detects a difference in a variation rate of the reception-side processing data between a rising process and a holding process of the supplied current and sets the reference point for the reception-side processing data at a portion thereof where switching from the rising process to the holding process occurs.

Preferably, the data synchronization unit calculates a time lag between the supply-side processing data and the reception-side processing data on the basis of the reference points and synchronizes the supply-side processing data and the reception-side processing data on the basis of the time lag.

According to the present invention, a reference point is set for the supply-side processing data on the basis of the variation rate of the supply-side processing data, and a reference point is set for the reception-side processing data on the basis of the variation rate of the reception-side processing data. Therefore, the supply-side processing data and the reception-side processing data can be synchronized. As a result, the supply-side processing data and the reception-side processing data can be adequately compared and whether or not the power supply state between the electric charger and the electric vehicle is normal can be accurately determined.

DESCRIPTION OF THE PREFERRED EMBODIMENTS

Figure 1:
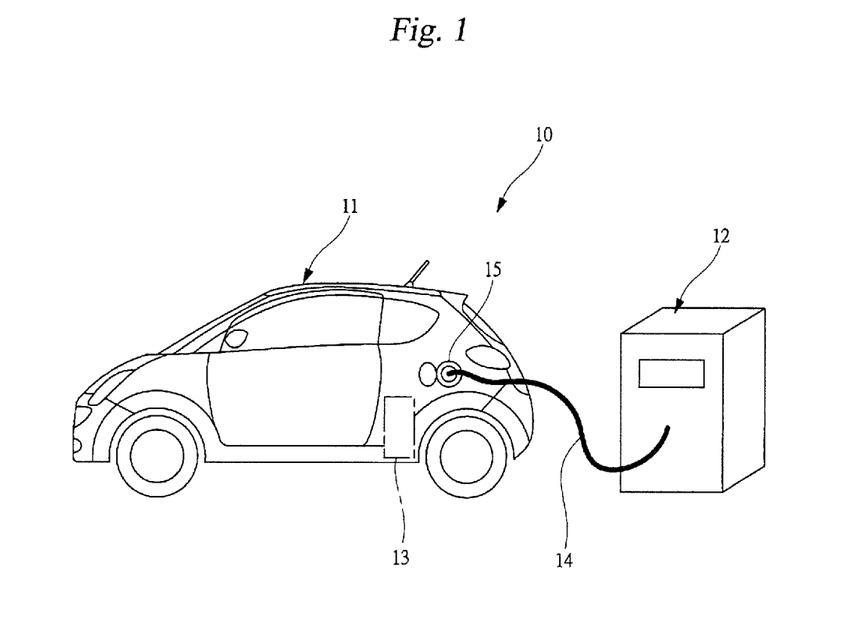
FIG. 1 is schematic diagram illustrating charging performed with an electric charging system according to an embodiment of the present invention.
Figure 2:
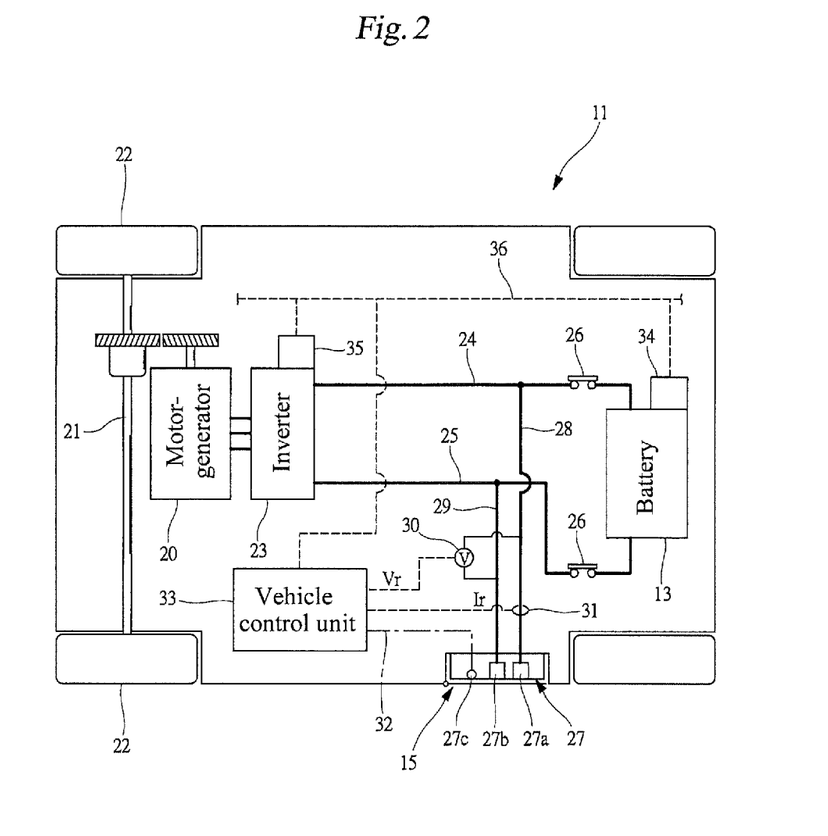
FIG. 2 is a schematic diagram showing the internal structure of an electric vehicle constituting the electric charging system.
Figure 3:
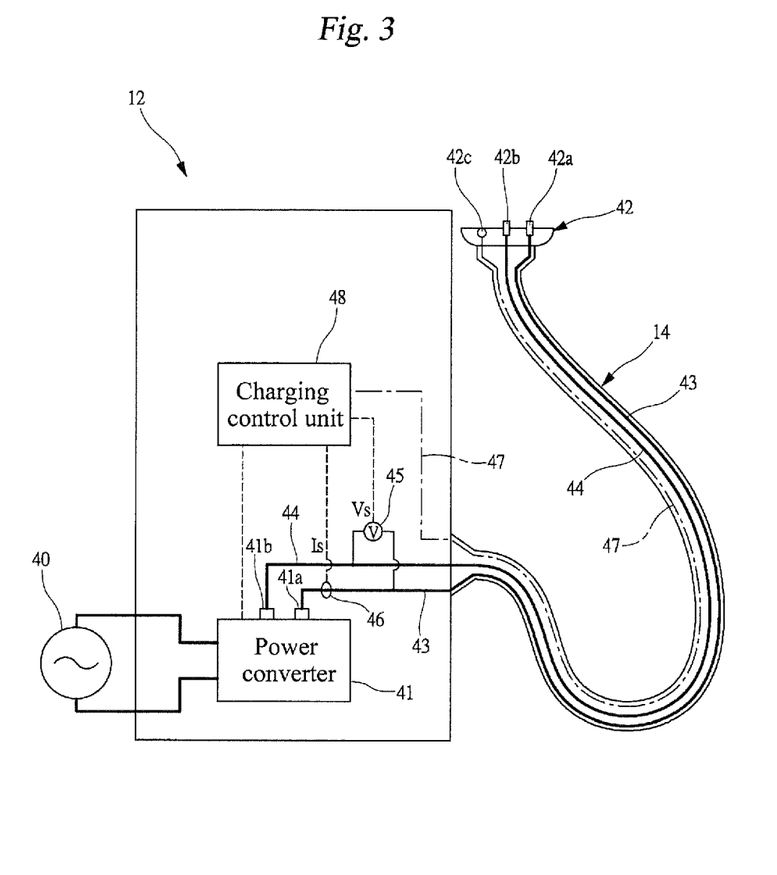
FIG. 3 is a schematic diagram showing the internal structure of an electric charger constituting the electric charging system.

An embodiment of the present invention will hereunder be described with reference to the drawings. FIG. 1 is schematic diagram illustrating charging performed with an electric charging system 10 according to an embodiment of the present invention. FIG. 2 is a schematic diagram showing the internal structure of an electric vehicle 11 constituting the electric charging system 10. FIG. 3 is a schematic diagram showing the internal structure of an electric charger 12 constituting the electric charging system 10. As shown in FIG. 1, the electric vehicle 11 is equipped with a battery 13 as an electric storage device. When the battery 13 is charged, a charging cable 14 of the electric charger 12 is connected to a charging port 15 of the electric vehicle 11. The electric charger 12 charges the battery 13 to a predetermined voltage, while controlling the charging current or charging voltage supplied to the electric vehicle 11. The electric charger 12 can use a constant-current charging method in which the battery 13 is charged at a constant current, a constant-voltage charging method in which the battery 13 is charged at a constant voltage, a constant-power charging method in which the battery 13 is charged at a constant power, and a constant-current and constant-voltage charging method in which the constant-current charging and constant-voltage charging are switched by a timer.

As shown in FIG. 2, the electric vehicle 11 includes a motor-generator 20 for propulsion. The motor-generator 20 is connected to drive wheels 22 by a drive axle 21. The motor-generator 20 and the battery 13 are connected by an inverter 23 that bidirectionally converts DC power and AC power. A main relay 26 is provided in electric power lines 24 and 25 that connect the battery 13 and the inverter 23. A power receiving connector 27 is provided in the electric charging port 15 at the vehicle body side. The power receiving connector 27 is provided with a pair of power receiving terminals 27a and 27b. The power receiving terminal 27a is connected to the electric power line 24 at a positive electrode side, via a power receiving line 28. The power receiving terminal 27b is connected to the electric power line 25 at negative electrode side, via a power receiving line 29. The electric vehicle 11 is also provided with a voltage sensor 30 that detects a voltage between the power receiving lines 28 and 29, that is, a received voltage Vr, and a current sensor 31 that detects a current in the power receiving line 28, that is, a received current Ir. The power receiving connector 27 is provided with a signal terminal 27c, and the communication lines 32 is connected to the signal terminal 27c. The electric vehicle 11 is also provided with a vehicle control unit 33 that integrally controls the entire vehicle, a battery control unit 34 that controls the battery 13, and a motor control unit 35 that controls the inverter 23. The control units 33 to 35 are connected to each other via a communication network 36. Each of the control units 33 to 35 is equipped with a CPU, a memory and the like.

As shown in FIG. 3, the electric charger 12 is provided a power converter 41 that converts AC power from an external power source 40 to DC power for charging. The power converter 41 includes a rectifier circuit, an electric transformer, a switching circuit and the like. An end of the charging cable 14 of the electric charger 12 is provided with a power supply connector 42 that is attachable and detachable with respect to the power receiving connector 27. The power supply connector 42 has a pair of power supply terminals 42a and 42b that correspond to the power receiving terminals 27a and 27b of the power receiving connector 27. The power supply terminal 42a is connected to a positive electrode terminal 41a of the power converter 41 via a power supply line 43, while the power supply terminal 42b is connected to a negative electrode terminal 41b of the power converter 41 via a power supply line 44. The electric charger 12 has a voltage sensor 45 that detects a voltage between power supply lines 43 and 44, that is, a supplied voltage Vs, and a current sensor 46 that detects a current in the power supply line 43, that is, a supplied current Is. The power supply connector 42 has a signal terminal 42c. A communication line 47 is connected to the signal terminal 42c. The electric charger 12 includes a charging control unit 48 that is constituted by a CPU, a memory and the like. Control signals are outputted from the charging control unit 48 to the power converter 41.

Figure 4:
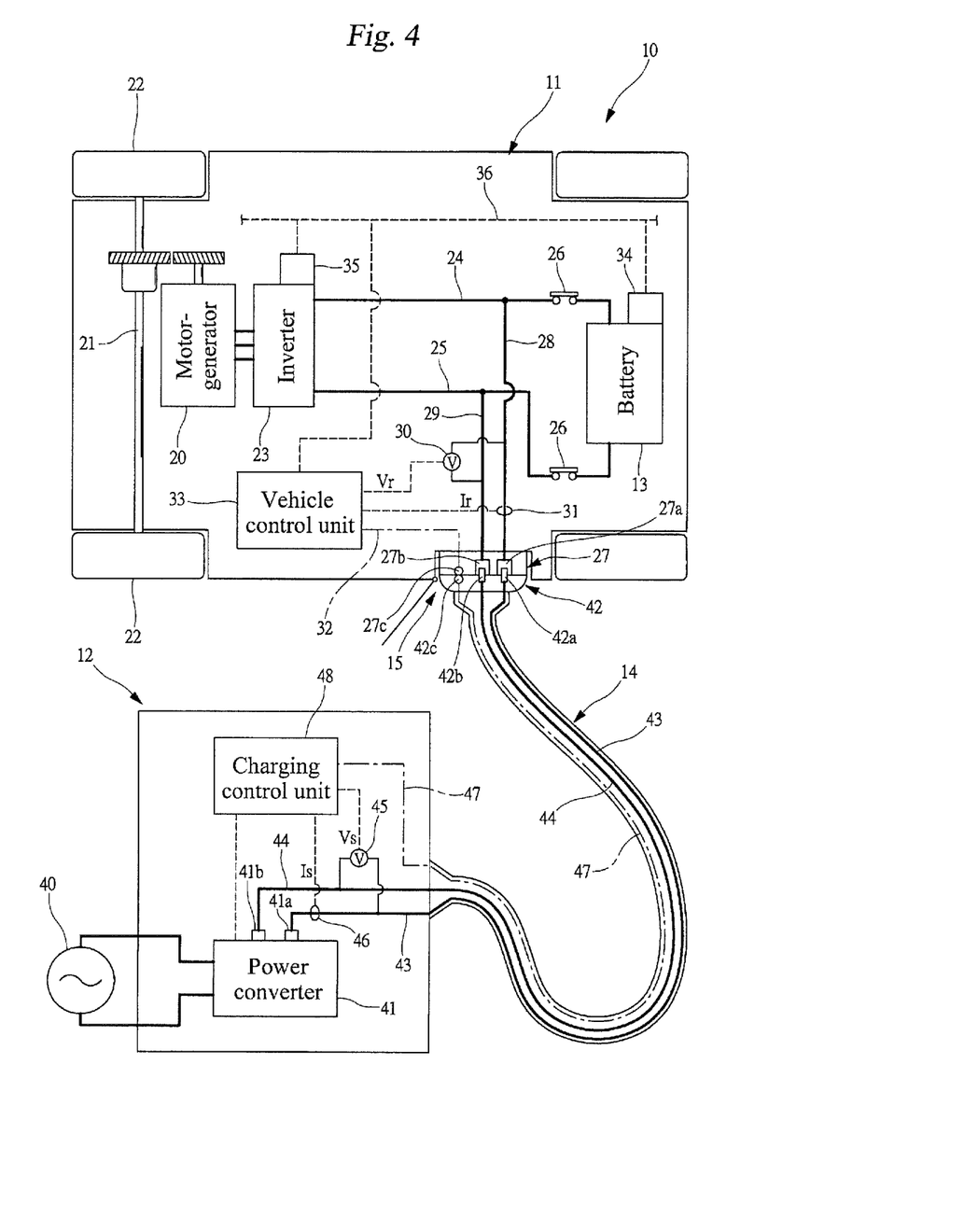
FIG. 4 is a schematic diagram illustrating a state in which the charging cable of the electric charger is connected to the charging port of the electric vehicle.

FIG. 4 is a schematic diagram showing a state where the charging cable 14 of the electric charger 12 is connected to the charging port 15 of the electric vehicle 11. As shown in FIG. 4, when the power supply connector 42 of the charging cable 14 is connected to the power receiving connector 27 of the charging port 15, a state is assumed in which the power converter 41 and the battery 13 are connected by the power supply lines 43 and 44 and the power receiving lines 28 and 29. Further, when the power supply connector 42 of the charging cable 14 is connected to the power receiving connector 27 of the charging port 15, a state is assumed in which the vehicle control unit 33 and the charging control unit 48 are connected by the communication lines 32 and 47. Where the electric charger 12 and the electric vehicle 11 are thus connected, charging information is transmitted from the vehicle control unit 33 to the charging control unit 48 via the communication lines 32 and 47. This charging information includes a current command value, a voltage command value, a cell temperature, a charge state SOC, and the like. The charging control unit 48 outputs a control signal to the power converter 41 such as to obtain the supplied current Is corresponding to the current command value or the supplied voltage Vs corresponding to the voltage command value, and charges the battery 13 to a predetermined voltage. In the explanation above, the charging current or the like is indicated to the electric charger 12 from the electric vehicle 11, but such configuration is not limiting, and the charging current may be also set by the charging control unit 48.

Figure 5:
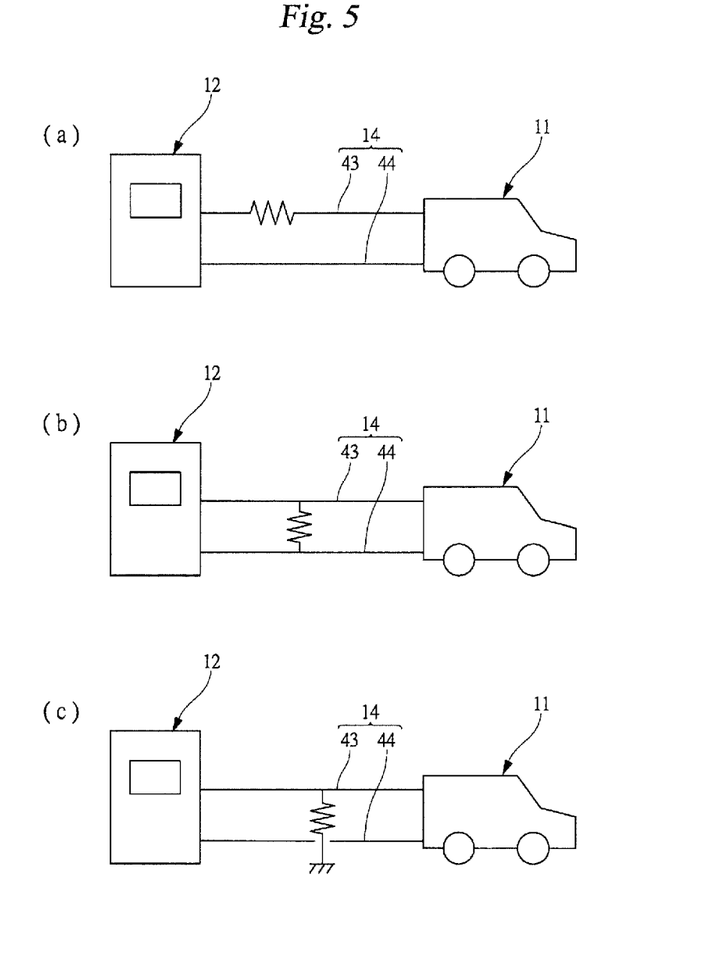
FIGS. 5A to 5C are explanatory drawings illustrating examples of power supply abnormality occurring between an electric charger and an electric vehicle.

Further, since high-voltage or high-current power (for example DC 400 V, 100 A) is supplied from the electric charger 12 to the electric vehicle 11 during charging, it is important to prevent current leak or heat generation by monitoring insulation failure or disconnection of the power supply lines 43 and 44. Accordingly, the vehicle control unit 33 compares the received voltage Vr with the supplied voltage Vs during charging, and when a difference between the received voltage Vr and the supplied voltage Vs becomes large and exceeds a predetermined value, the vehicle control unit determines that a disconnection of power supply lines 43 and 44 or a connection failure in the connector 27 and 42 has occurred, as shown in FIG. 5A. The vehicle control unit 33 also compares the received current Ir with the supplied current Is during charging, and when a difference between the received current Ir and the supplied current Is becomes large and exceeds a predetermined value, the vehicle control unit determines that the power supply lines 43 and 44 have been short circuited or grounded, as shown in FIGS. 5B and 5C. Thus, the vehicle control unit 33 functioning as a detection unit compares the received voltage Vr with the supplied voltage Vs and also compares the received current Ir with the supplied current Is to determine whether the power supply state between the electric charger 12 and the electric vehicle 11 is normal. Where the power supply state is found to be abnormal, the vehicle control unit 33 outputs a charging interruption signal to the charging control unit 48 and cuts off power supply from the electric charger 12. FIGS. 5A to 5C are explanatory drawings illustrating examples of power supply abnormalities that can occur between the electric charger 12 and the electric vehicle 11.

Figure 6:
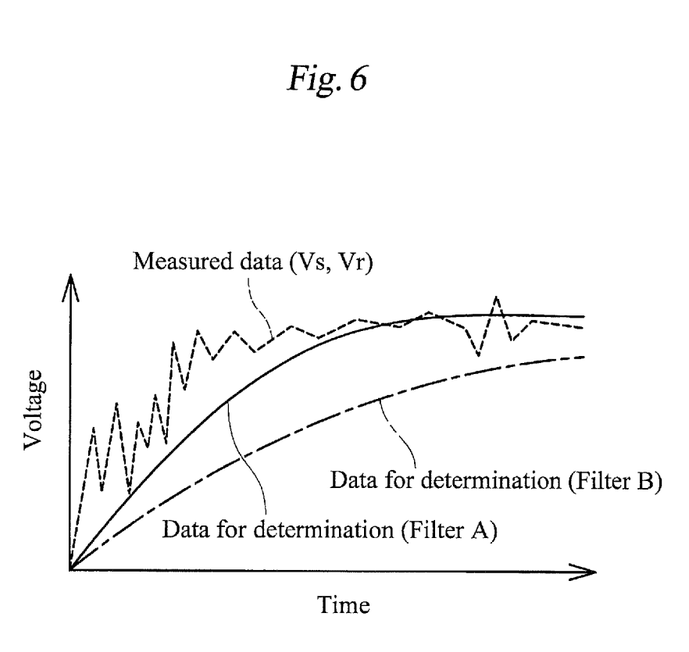
FIG. 6 is an explanatory drawing illustrating the effect produced by the filter processing on the received voltage or supplied voltage.

However, when the received voltage Vr, supplied voltage Vs, received current Ir, and supplied current Is from the voltage sensors 30 and 45 and the current sensors 31 and 46 are used as described above to detect a power supply abnormality, it is necessary to eliminate the effect of noise by performing a filter processing such as a moving average processing or a weighted average processing. FIG. 6 is an explanatory drawing illustrating the effect of filter processing on the received voltage Vr and supplied voltage Vs, but a similar effect is also produced by a filter processing on the received current Ir and supplied current Is. As shown in FIG. 6, when the actually measured data detected by the voltage sensors 30 and 45 are subjected to a filter processing and the filtered data for determination are obtained from the actually measured data, a time lag occurs between the actually measured data and data for determination. The length of the time lag caused by the filter processing varies depending on the contents of the filter processing. Thus, when there is a difference between the filter processing performed with respect to the received voltage Vr or received current Ir at the electric vehicle side and the filter processing performed with respect to the supplied voltage Vs or supplied current Is at the electric charger side, a time lag occurs between vehicle-side data (reception-side processed data) Dr based on the received voltage Vr or received current Ir and the electric-charger-side data (supply-side processed data) Ds based on the supplied voltage Vs or supplied current Is. Therefore, in order to determine an insulation failure or power line disconnection by comparing the vehicle-side data Dr with the electric-charger-side data Ds, it is necessary to perform the comparison after determining the time lag and synchronizing the vehicle-side data Dr with the electric-charger-side data Ds.

Accordingly, the vehicle control unit 33 detects the time lag between the vehicle-side data Dr and the electric-charger-side data Ds during charging and synchronizes the vehicle-side data Dr with the electric-charger-side data Ds on the basis of the time lag. Then the vehicle control unit 33 compares the synchronized vehicle-side data Dr and electric-charger-side data Ds, thereby determining whether or not the power supply state between the electric charger 12 and the electric vehicle 11 is normal. In the present embodiment, the vehicle-side data Dr are calculated by the vehicle control unit 33, and the electric-charger-side data Ds are calculated by the charging control unit 48. The electric-charger-side data Ds calculated by the charging control unit 48 are transmitted to the vehicle control unit 33 via the communication lines 32 and 47.

Figure 7:
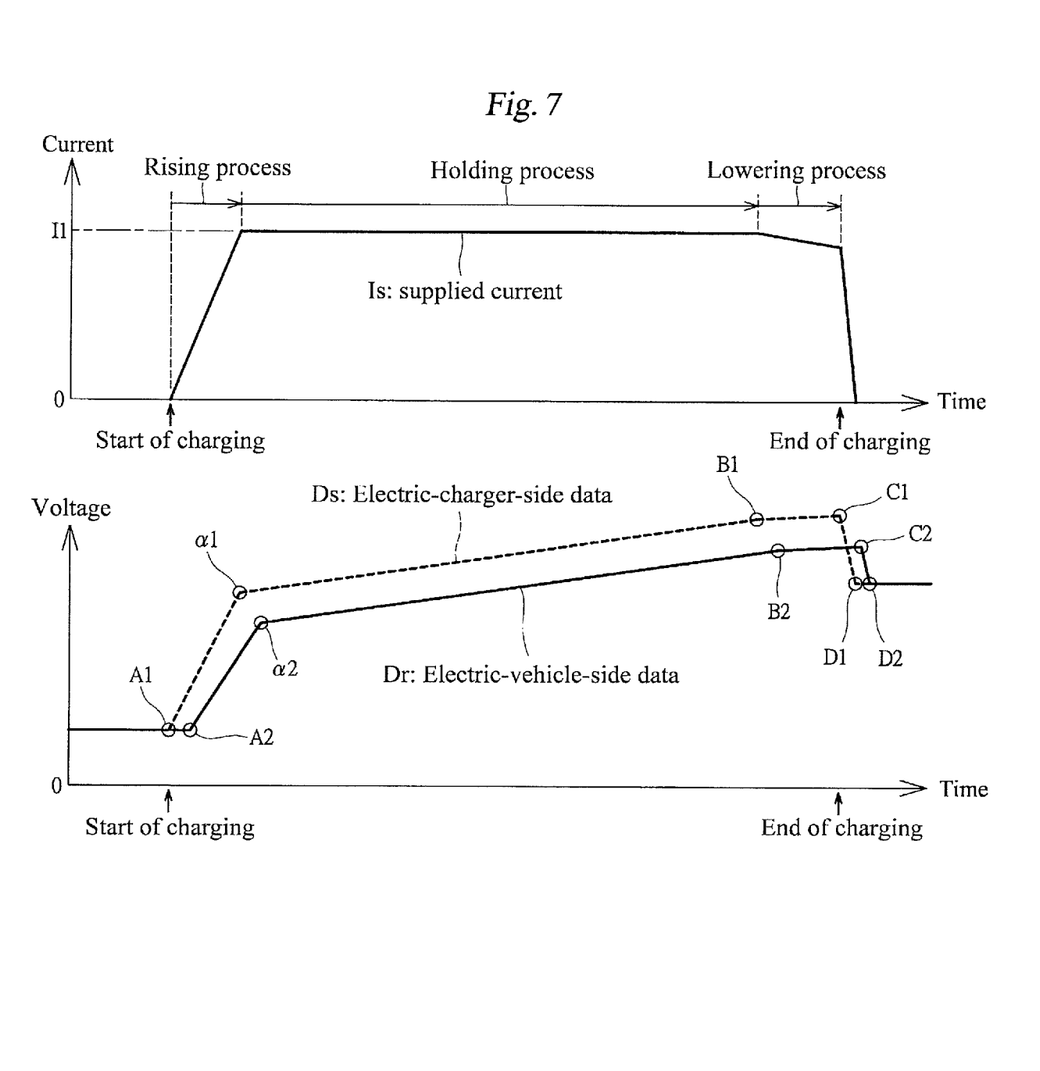
FIG. 7 is a diagram illustrating the variation state of supplied current, electric-charger-side data, and vehicle-side data during charging.

FIG. 7 is a diagram illustrating the variation states of the supplied current Is, electric-charger-side data Ds, and vehicle-side data Dr during charging. In the explanation below, the electric-charger-side data Ds stand for data obtained by subjecting the supplied voltage Vs to the filter processing, and the vehicle-side data Dr stand for data obtained by subjecting the received voltage Vr to the filter processing. As shown in FIG. 7, the electric charger 12 charges the battery 13 by constant-current charging. The electric charger 12 rises the supplied current Is to a predetermined current I1 at a predetermined rise speed from the start of the charging (rising process) and then performs the adjustment to hold the supplied current Is at the predetermined current I1, while increasing the supplied voltage Vs (holding process). The holding process is continued till the received voltage Vr at the battery side reaches a predetermined target voltage. In the subsequent, lowering process, the electric charger 12 continues the charging till the received voltage Vr reaches the final target voltage, while gradually lowering the supplied current Is. In such constant-current charging, the supplied voltage Vs and the received voltage Vr, that is, the electric-charger-side data Ds and the vehicle-side data Dr, increase rapidly at a first rise speed in the rising process and increase gradually at a second rise speed, which is less than the first rise speed, in the holding process.

Figure 8:
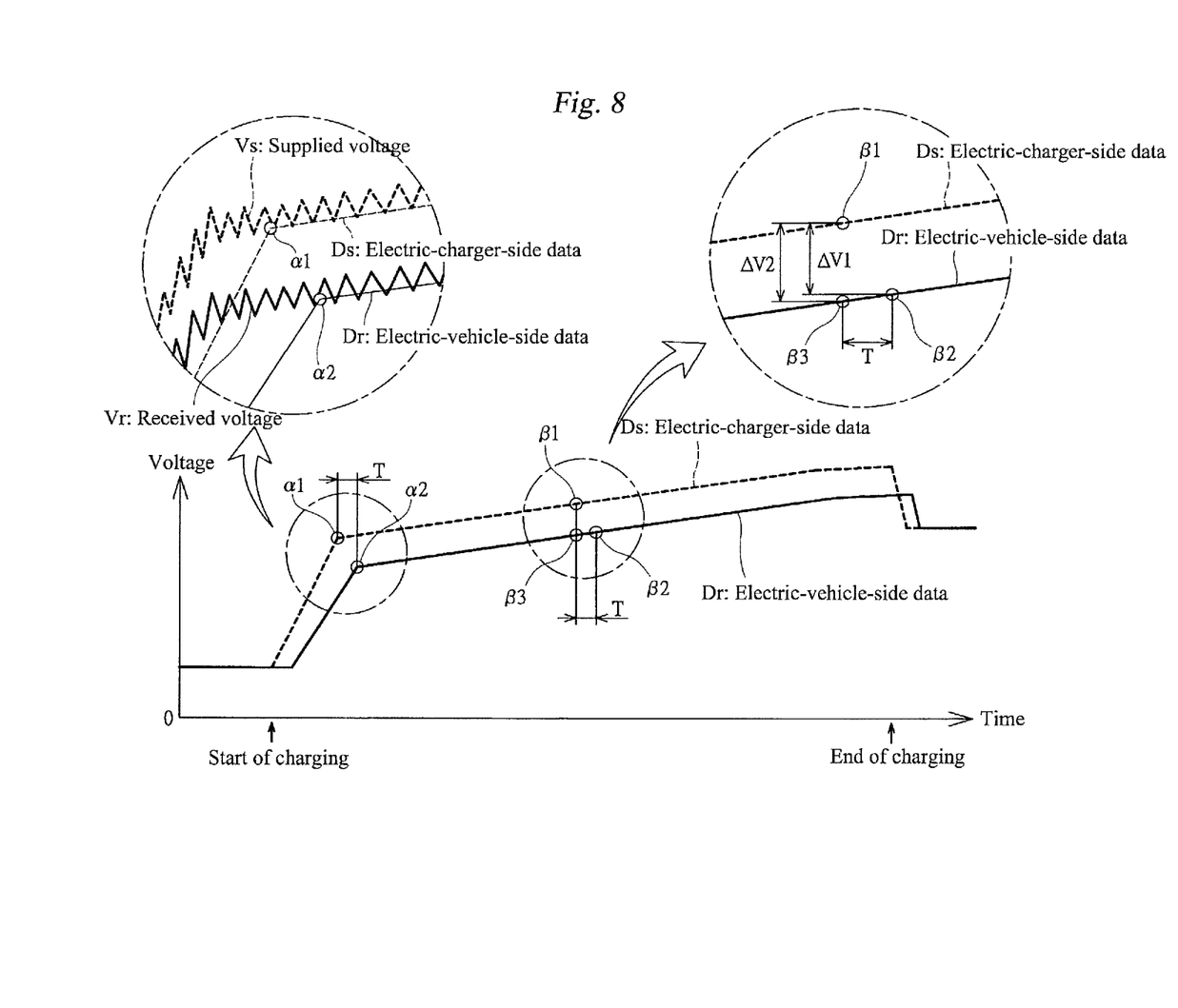
FIG. 8 is an explanatory drawing illustrating the variation state of electric-charger-side data and vehicle-side data during charging.

FIG. 8 is an explanatory drawing illustrating the variation state of the electric-charger-side data Ds and vehicle-side data Dr during charging. In the explanatory drawing in FIG. 8, the diagram of the electric-charger-side data Ds and vehicle-side data Dr shown in FIG. 7 is provided with explanations. As shown in FIG. 8, the vehicle control unit 33 functioning as a first reference setting unit sets a reference point $\alpha 1$ for the electric-charger-side data Ds at a portion thereof where the rising process is switched to the holding process on the basis of a difference in the rise speed (variation rate) of the electric-charger-side data Ds between the rising process and the holding process. Thus, a point in which the rise speed of the electric-charger-side data Ds varies in excess of a predetermined value is set as the reference point $\alpha 1$. Likewise, the vehicle control unit 33 functioning as a second reference setting unit sets a reference point $\alpha 2$ for the vehicle-side data Dr at a portion where the rising process is switched to the holding process on the basis of a difference in the rise speed (variation rate) of the vehicle-side data Dr between the rising process and the holding process. Thus, a point in which the rise speed of the vehicle-side data Dr varies in excess of a predetermined value is set as the reference point $\alpha 2$. Further, since the power supply lines 43 and 44 where the supply voltage Vs is measured and the reception lines 28 and 29 where the received voltage Vr is measured are connected, the rise speed of the supplied voltage Vs and the rise speed of the received voltage Vr change at the same timing as shown in the enlarged views in FIG. 8. Thus, since the rise speed of the electric-charger-side data Ds for which the supplied voltage Vs serves as a basis and the rise speed of the vehicle-side data Dr for which the received voltage Vr serves as a basis thus change at the same timing, the reference points $\alpha 1$ and $\alpha 2$ are at the same timing.

Since the reference point $\alpha 1$ of the electric-charger-side data Ds and the reference point $\alpha 2$ of the vehicle-side data Dr are thus at the same timing, the vehicle control unit 33 functioning as a data synchronization unit measures the time interval between the reference point $\alpha 1$ and the reference point $\alpha 2$ and calculates a time lag T (for example, 0.5 sec) between the electric-charger-side data Ds and the vehicle-side data Dr caused by the filter processing. When a power supply abnormality such as insulation failure of power line disconnection is determined, the electric-charger-side data Ds (symbol $\beta 1$) and the vehicle-side data Dr (symbol $\beta 2$) are compared by taking the time lag T into account. Thus, when the electric-charger-side data Ds (symbol $\beta 1$) and the vehicle-side data Dr (symbol $\beta 3$) that have been outputted at the same timing are simply compared, the electric-charger-side data Ds and the vehicle-side data Dr are erroneously determined to be separated by a difference $\Delta V2$. By contrast, by synchronizing the electric-charger-side data Ds and the vehicle-side data Dr on the basis of the time lag T, it is possible to compare the electric-charger-side data Ds (symbol $\beta 1$) with the vehicle-side data Dr (symbol $\beta 2$). As a result, the difference $\Delta V1$ between the electric-charger-side data Ds and the vehicle-side data Dr can be adequately verified and the insulation failure or power line disconnection can be accurately determined.

Further, the reference point $\alpha 1$ is set on the basis of the rise speed of the electric-charger-side data Ds in the charging process, and the reference point $\alpha 2$ is set on the basis of the rise speed of the vehicle-side data Dr in the charging process. Since the reference points $\alpha 1$ and $\alpha 2$ are thus set using the variation in the rise speed appearing in the usual charging process, it is not necessary to change intentionally the supplied voltage Vs or supplied current Is in order to set the reference points $\alpha 1$ and $\alpha 2$. Thus, by causing the vehicle control unit 33 of the electric vehicle 11 to act as the first reference setting unit, second reference setting unit, data synchronization unit, and determination unit, it is possible to determine whether or not a power supply state between the electric charger 12 and the electric vehicle 11 is normal, without changing the specifications of the existing electric charger 12.

In the explanation above, the reference points $\alpha 1$ and $\alpha 2$ located at the boundary of the rising process and holding process are set as reference points for the electric-charger-side data Ds and the vehicle-side data Dr, but such configuration is not limiting, and the timing at which a variation in the variation rate (variation speed) appears in the electric-charger-side data Ds and the vehicle-side data Dr may be also used. For example, as shown in FIG. 7, reference points A1 and A2, which indicate the timing of the start of charging, and reference points B1 and B2 that are positioned at the boundary of the holding process and lowering process may be also used. Further, reference points C1 and C2, which indicate the timing of the end of charging (current interruption), may be used and reference point D1 and D2, which indicate the timing at which the received voltage Vr and the supplied voltage Vs converge to the battery voltage after the end of charging, may be also used. Further, in the explanation above, the battery 13 is charged at a constant current, but such feature is not limiting, and the present invention may be also used when the battery 13 is charged at a constant voltage, at a constant power, or at a constant current and constant voltage.

Further, in the explanation above, the electric-charge-side data Ds obtained by subjecting the supplied voltage Vs to the filter processing and the vehicle-side data Dr obtained by subjecting the supplied voltage Vr to the filter processing are compared with each other, but such feature is not limiting. For example, the electric-charge-side data Ds obtained by subjecting the supplied current Is to the filter processing and the vehicle-side data Dr obtained by subjecting the received current Ir to the filter processing may be also compared with each other. Further, the vehicle-side data Dr obtained by subjecting the received power Wr (=Ir×Vr) at the electric vehicle side to the filter processing and the electric-charge-side data Ds obtained by subjecting the supplied power Ws (=Is×Vs) at the electric charger side to the filter processing may be also compared with each other. In those cases, the reference points are also set for the electric-charger-side data Ds and the vehicle-side data Dr on the basis of the rise speed (variation rate) or lowering speed (variation rate) of the electric-charger-side data Ds and the vehicle-side data Dr.

The present invention is not limited to the above-described embodiments, and it goes without saying that various changes may be made without departing from the scope of the invention. In the explanation above, the vehicle control unit 33 is caused to function as the first reference setting unit, second reference setting unit, data synchronization unit, and determination unit, but such configuration is not limiting. For example, the first reference setting unit, second reference setting unit, data synchronization unit, and determination unit may be aggregated with either of the charging control unit 48 and the vehicle control unit 33, or may be distributed to both the charging control unit 48 and the vehicle control unit 33. Further, in the explanation above, the vehicle control unit 33 calculates the vehicle-side data Dr, but when the charging control unit 48 is caused to calculate the vehicle-side data Dr, the received voltage Vr, received current Ir, or received power Wr is transmitted to the charging control unit 48 via the communication lines 32 and 47. Likewise, the charging control unit 48 calculates the electric-charger-side data Ds, but when the vehicle control unit 33 is caused to calculate electric-charger-side data Ds, the supplied voltage Vs, supplied current Is, or supplied power Ws is transmitted to the vehicle control unit 33 via the communication lines 32 and 47.

Further, the moving average processing and weighted average processing are considered as the filter processing methods to be used for calculating the vehicle-side data Dr or the electric-charger-side data Ds, but such feature is not limiting. For example, the filter processing may be performed with hardware by using an electric circuit, or with software by using a program. Further, the illustrated electric vehicle 11 shown in the figures is an electric vehicle which has only the motor-generator 20 for propulsion, but it may also be a hybrid-type electric vehicle that includes the motor-generator 20 and an engine for propulsion. Further, the battery 13 such as a lithium-ion secondary battery and a nickel hydride secondary battery is used as the electric storage device, but the present invention is not limited to such configuration. Thus, a capacitor such as a lithium-ion capacitor and an electric double layer capacitor may be used as the electric storage device. Furthermore, in the explanation above, the electric charger 12 of a conductive system is used in which a contact-type power supply connector 42 is provided at the charging cable 14, but such configuration is not limiting and an inductive-type electric charger in which a contactless power supply connector is provided at the charging cable may be also used.

What is claimed is:

1. An electric charging system in which an electric charger and an electric vehicle are connected by a charging cable, and an electric storage device installed in the electric vehicle is charged, the electric charging system comprising:
    a first reference setting unit for setting a reference point on the basis of a variation rate of supply-side processing data, the reference point being set with respect to the supply-side processing data that are calculated by subjecting a supplied voltage, a supplied current, or a supplied power at the electric charger side to a predetermined filter processing;
    a second reference setting unit for setting a reference point on the basis of a variation rate of reception-side processing data, the reference point being set with respect to the reception-side processing data that are calculated by subjecting a received voltage, a received current, or a received power at the electric vehicle side to a predetermined filter processing;
    a data synchronization unit for synchronizing the supply-side processing data and the reception-side processing data on the basis of the reference points of the supply-side processing data and the reception-side processing data; and
    a determination unit for comparing the synchronized supply-side processing data and reception-side processing data and determining whether or not a power supply state between the electric charger and the electric vehicle is normal.

2. The electric charging system according to claim 1, wherein
    the electric charger performs constant-current charging in which the supplied current is raised to a predetermined current and then held at the predetermined current;
    the first reference setting unit detects a difference in a variation rate of the supply-side processing data between a rising process and a holding process of the supplied current and sets the reference point for the supply-side processing data at a portion thereof where switching from the rising process to the holding process occurs; and
    the second reference setting unit detects a difference in a variation rate of the reception-side processing data between a rising process and a holding process of the supplied current and sets the reference point for the reception-side processing data at a portion thereof where switching from the rising process to the holding process occurs.

3. The electric charging system according to claim 1, wherein
    the data synchronization unit calculates a time lag between the supply-side processing data and the reception-side processing data on the basis of the reference points and synchronizes the supply-side processing data and the reception-side processing data on the basis of the time lag.

4. The electric charging system according to claim 2, wherein
    the data synchronization unit calculates a time lag between the supply-side processing data and the reception-side processing data on the basis of the reference points and synchronizes the supply-side processing data and the reception-side processing data on the basis of the time lag.

5. An electric vehicle provided with an electric storage device connected to an electric charger by a charging cable and charged by the electric charger, the vehicle comprising:
    a first reference setting unit for setting a reference point on the basis of a variation rate of supply-side processing data, the reference point being set with respect to the supply-side processing data that are calculated by subjecting a supplied voltage, a supplied current, or a supplied power at the electric charger side to a predetermined filter processing;
    a second reference setting unit for setting a reference point on the basis of a variation rate of reception-side processing data, the reference point being set with respect to the reception-side processing data that are calculated by subjecting a received voltage, a received current, or a received power at the electric vehicle side to a predetermined filter processing;
    a data synchronization unit for synchronizing the supply-side processing data and the reception-side processing data on the basis of the reference points of the supply-side processing data and the reception-side processing data; and
    a determination unit for comparing the synchronized supply-side processing data and reception-side processing data and determining whether or not a power supply state between the electric charger and the electric vehicle is normal.

6. The electric vehicle according to claim 5, wherein
    the electric charger performs constant-current charging in which the supplied current is raised to a predetermined current and then held at the predetermined current;
    the first reference setting unit detects a difference in a variation rate of the supply-side processing data between a rising process and a holding process of the supplied current and sets the reference point for the supply-side processing data at a portion thereof where switching from the rising process to the holding process occurs; and the second reference setting unit detects a difference in a variation rate of the reception-side processing data between a rising process and a holding process of the supplied current and sets the reference point for the reception-side processing data at a portion thereof where switching from the rising process to the holding process occurs.

7. The electric vehicle according to claim 5, wherein the data synchronization unit calculates a time lag between the supply-side processing data and the reception-side processing data on the basis of the reference points and synchronizes the supply-side processing data and the reception-side processing data on the basis of the time lag.

8. The electric vehicle according to claim 6, wherein the data synchronization unit calculates a time lag between the supply-side processing data and the reception-side processing data on the basis of the reference points and synchronizes the supply-side processing data and the reception-side processing data on the basis of the time lag.

* * * * *